US012750176B2

(12) United States Patent
Zhou et al.

(10) Patent No.: US 12,750,176 B2
(45) Date of Patent: Sep. 29, 2026

(54) METHOD FOR DETERMINING REFERENCE SIGNAL OR REFERENCE SIGNAL RESOURCE OR REFERENCE SIGNAL RESOURCE SET, ELECTRONIC DEVICE, AND MEDIUM

(71) Applicant: SPREADTRUM COMMUNICATIONS (SHANGHAI) CO., LTD. ZONE, Shanghai (CN)

(72) Inventors: Huayu Zhou, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 721 days.

(21) Appl. No.: 17/799,289

(22) PCT Filed: Feb. 5, 2021

(86) PCT No.: PCT/CN2021/075639

§ 371 (c)(1),
(2) Date: Aug. 12, 2022

(87) PCT Pub. No.: WO2021/160045

PCT Pub. Date: Aug. 19, 2021

(65) Prior Publication Data

US 2023/0077543 A1 Mar. 16, 2023

(30) Foreign Application Priority Data

Feb. 14, 2020 (CN) ......................... 202010093484.4

(51) Int. Cl.
*H04L 5/00* (2006.01)

(52) U.S. Cl.
CPC .................................. *H04L 5/0048* (2013.01)

(58) Field of Classification Search
None
See application file for complete search history.

(56) References Cited

U.S. PATENT DOCUMENTS

2014/0198763 A1 7/2014 Sorrentino et al.
2019/0141693 A1* 5/2019 Guo ...................... H04L 5/0053
(Continued)

FOREIGN PATENT DOCUMENTS

CN 109565432 A 4/2019
CN 110034872 A 7/2019
(Continued)

OTHER PUBLICATIONS

Intel Corporation: "Remaining details of RRM measurements", 3GPP Draft; R1-1804708 Intel RRM, vol. RAN WG1, No. Sanya, China; Apr. 15, 2018.
(Continued)

*Primary Examiner* — Steve R Young
(74) *Attorney, Agent, or Firm* — HAUPTMAN HAM, LLP

(57) ABSTRACT

A method for determining a reference signal or reference signal resource or reference signal resource set, an electronic device, and a medium are provided in the disclosure. The method includes: obtaining configuration information; and determining, based on the configuration information, a number or index of a synchronization signal/physical broadcast channel block associated with the reference signal or reference signal resource or reference signal resource set.

17 Claims, 10 Drawing Sheets

(56) References Cited

U.S. PATENT DOCUMENTS

| | | | | |
|---|---|---|---|---|
| 2019/0379431 | A1* | 12/2019 | Park | H04L 27/2613 |
| 2019/0394749 | A1 | 12/2019 | Islam et al. | |
| 2020/0044797 | A1* | 2/2020 | Guo | H04W 72/21 |
| 2020/0145855 | A1* | 5/2020 | Hahn | H04B 7/088 |
| 2020/0314777 | A1* | 10/2020 | Liu | H04W 72/0446 |
| 2020/0404601 | A1* | 12/2020 | Lin | H04L 1/0072 |
| 2021/0135946 | A1* | 5/2021 | Babaei | H04L 1/1854 |
| 2021/0227496 | A1* | 7/2021 | Ly | H04W 76/27 |
| 2021/0306867 | A1* | 9/2021 | Hamidi-Sepehr | H04L 5/0094 |
| 2021/0409167 | A1* | 12/2021 | Shi | H04L 1/1887 |
| 2023/0087737 | A1 | 3/2023 | Zhou et al. | |

FOREIGN PATENT DOCUMENTS

| | | | |
|---|---|---|---|
| CN | 110268667 | A | 9/2019 |
| CN | 110690950 | A | 1/2020 |
| WO | 2019097356 | A1 | 5/2019 |
| WO | 2019102064 | A1 | 5/2019 |
| WO | 2019179261 | A1 | 9/2019 |
| WO | 2021139833 | A1 | 7/2021 |

OTHER PUBLICATIONS

The extended European search report issued in corresponding EP application No. 21754041.8 dated Feb. 15, 2024.

The third office action issued in corresponding CN application No. 202010093484.4 dated Sep. 21, 2022.

The decision of rejection issued in corresponding CN application No. 202010093484.4 dated Mar. 13, 2023.

3GPP, R1-1907841, FL Summary for 7.2.10.4: PHY procedures for positioning measurements, dated May 16, 2019.

The first office action issued in corresponding CN application No. 202010093484.4 dated Jan. 5, 2022.

The second office action issued in corresponding CN application No. 202010093484.4 dated Jun. 20, 2022.

WIPO, International Search Report and Written Opinion for International Application No. PCT/CN2021/075639, dated Aug. 19, 2021.

* cited by examiner

METHOD FOR DETERMINING REFERENCE SIGNAL OR REFERENCE SIGNAL RESOURCE OR REFERENCE SIGNAL RESOURCE SET, ELECTRONIC DEVICE, AND MEDIUM

CROSS-REFERENCE TO RELATED APPLICATION(S)

This application is a National Stage of International Application No. PCT/CN2021/075639, filed on Feb. 5, 2021, which claims priority to Chinese Patent Application No. 202010093484.4, filed on Feb. 14, 2020, both of which are incorporated by reference herein.

TECHNICAL FIELD

The disclosure belongs to the technical field of information response methods, and in particular, relates to a method for determining a reference signal or reference signal resource or reference signal resource set, an electronic device, and a medium.

BACKGROUND

When a user equipment (UE) is in an idle mode (RRC IDLE state), the UE needs to monitor a paging physical downlink control channel (PDCCH). Generally, the UE needs to determine the paging PDCCH monitoring occasion through configuration of paging frame (PF), paging occasion (PO), and paging search space set. In the communication standard such as 5th generation (5G) new radio (NR), the UE can perform automatic gain control (AGC) adjustment, channel tracking (including time-frequency tracking and/or time-frequency synchronization, etc.), and measurement through synchronization signal/physical broadcast channel block (SS/PBCH block) or synchronization signal/physical broadcast channel block burst (SS/PBCH block burst). Generally, one SS/PBCH block burst can include multiple SS/PBCH blocks. The SS/PBCH block burst does not exist in every sub frame or every time slot, and the SS/PBCH block burst is transmitted in one kind of time period, such as 5 milliseconds, 10 milliseconds, 20 milliseconds, and the like. Thus, in general, the UE needs to wake up at least before the last one SS/PBCH block burst before the PO, and uses the last one SS/PBCH block burst for AGC adjustment and channel tracking, or for AGC adjustment, channel tracking, and measurement. When the UE sleeps for a long time, for example, the interval between two POs that need to be monitored by the UE is large due to the configuration of PO, the UE may need to wake up before the last two SS/PBCH block bursts before the PO. The UE uses one SS/PBCH block burst for AGC adjustment and the other SS/PBCH block burst for channel tracking, or uses one SS/PBCH block burst for AGC adjustment and channel tracking and the other SS/PBCH block burst for measurement. This will cause the UE to wake up in advance for a long time, which consumes more power.

SUMMARY

The disclosure provides a method for determining a reference signal or reference signal resource or reference signal resource set. The method includes: obtaining configuration information; and determining, based on the configuration information, a synchronization signal/physical broadcast channel block (SS/PBCH block) associated with the reference signal or reference signal resource or reference signal resource set.

The disclosure further provides an electronic device. The electronic device includes a memory and a processor. The memory is configured to store a computer program. The processor is coupled with the memory and configured to execute the computer program to implement the method for determining a reference signal or reference signal resource or reference signal resource set of the disclosure.

The disclosure further provides a non-transitory computer-readable storage medium. The non-transitory computer-readable storage medium stores a computer program thereon. When executed by a processor, the computer program implements operations of the method for determining a reference signal or reference signal resource or reference signal resource set of the disclosure.

DETAILED DESCRIPTION

The disclosure is further described below by way of embodiments, but the disclosure is not limited to the scope of the described embodiments.

Figure 1:
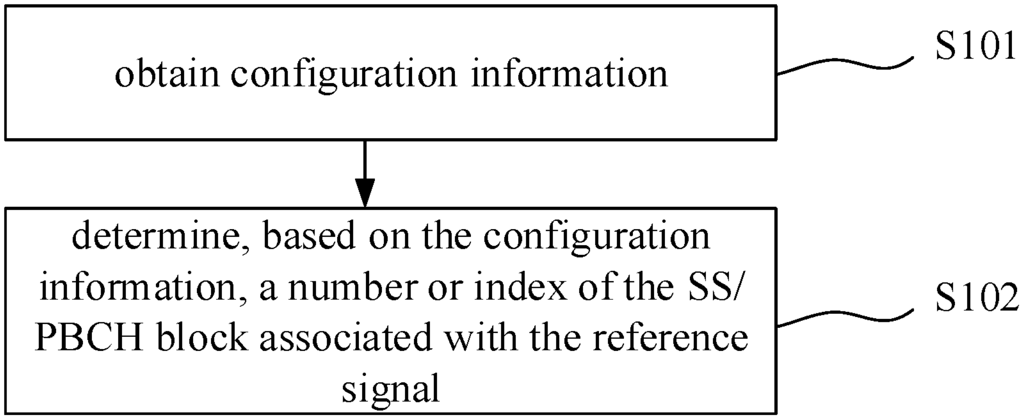
FIG. 1 is a flow chart of a method for determining a reference signal or reference signal resource or reference signal resource set of embodiments of the disclosure.

Embodiments of the disclosure provides a method for determining a reference signal or reference signal resource or reference signal resource set. Referring to FIG. 1, the method includes the following.

S101, obtain configuration information.

S102, determine, based on the configuration information, a synchronization signal/physical broadcast channel block (SS/PBCH block) associated with the reference signal or reference signal resource or reference signal resource set.

Since the synchronization signal/physical broadcast channel block burst (SS/PBCH block burst) and the reference signal or reference signal resource or reference signal resource set can be used cooperatively, the SS/PBCH block burst and the reference signal or reference signal resource or reference signal resource set can be associated. The user equipment (UE) obtains the configuration information, and determines the SS/PBCH block associated with the reference signal or reference signal resource or reference signal resource set based on the configuration information, for example, information on a number or index of the S S/PBCH block associated with the reference signal or reference signal resource or reference signal resource set. In other words, the UE obtains the configuration information, and determines the number or index of the SS/PBCH block associated with the reference signal or reference signal resource or reference signal resource set based on the configuration information.

In embodiments of the disclosure, determining the SS/PBCH block associated with the reference signal or reference signal resource or reference signal resource set can be equivalent to the following. Determine that the SS/PBCH block and the reference signal or reference signal resource or reference signal resource set are in a quasi co-location (QCL) relation, or in a quasi co-location type A (QCL-type A) relation, or in a quasi co-location type D (QCL-type D) relation. The determining the SS/PBCH block associated with the reference signal or reference signal resource or reference signal resource set can also be equivalent to the following. Determine an SS/PBCH block having a QCL relation with the reference signal or reference signal resource or reference signal resource set, or an SS/PBCH block having a QCL-type A relation with the reference signal or reference signal resource or reference signal resource set, an SS/PBCH block having a QCL-type D relation with the reference signal or reference signal resource or reference signal resource set. Generally, two signals (which can be SS/PBCH block(s) and/or reference signal(s) or reference signal resource(s) or reference signal resource set(s)) being in the QCL relation indicates that these two signals have some same large-scale properties, so that one signal can be used as a reference for channel estimation of the other signal. The QCL-type A and the QCL-type D are two QCL types. In general, two signals being in the QCL-type A relation indicates that these two signals have the same average delay, delay spread, Doppler shift, and Doppler spread; two signals being in the QCL-type D relation indicates that these two signals have the same spatial Rx parameter. In this way, the UE can determine the property of the reference signal by determining the property of the SS/PBCH block, or determine the property of the reference signal by detecting the SS/PBCH block. In the disclosure, signals having the QCL relation also includes signals having the same average gain, having the QCL-type A relation, and having the QCL-type D relation.

To shorten the time the UE wakes up in advance, a base station may transmit an additional reference signal after the last one SS/PBCH block burst before the PF or PO or the first paging physical downlink control channel (PDCCH) monitoring occasion. In this way, the UE can use the SS/PBCH block burst for automatic gain control (AGC) adjustment and channel tracking and use the additional reference signal for measurement.

The additional reference signal can be used for measurement, so the additional reference signal can be a channel state information-reference signal (CSI-RS) or a synchronization signal (SS). The additional reference signal may be used for mobility or for radio resource management (RRM)/radio link monitoring (RLM) measurement, and thus may be CSI-RS for mobility or CSI-RS for RRM/RLM measurement. CSI-RS for mobility or CSI-RS for RRM/RLM measurement may use non zero power (NZP) CSI-RS resource.

To shorten the time the UE wakes up in advance, the base station may transmit two additional reference signals before the PF or PO or the first paging PDCCH monitoring occasion. In this way, the UE can use the first additional reference signal for AGC adjustment and channel tracking and the second additional reference signal for measurement.

The additional reference signal can be used for AGC adjustment and channel tracking, so the additional reference signal may be a tracking reference signal (TRS) or an SS. The TRS may use NZP-CSI-RS-ResourceSet.

Generally, the TRS can include four NZP CSI-RS resources in two consecutive time slots and there are two NZP CSI-RS resources in each time slot; or the TRS can include two NZP CSI-RS resources in one time slot. The TRS can be periodic or aperiodic. When the TRS is periodic, CSI-RS resources in the NZP-CSI-RS-ResourceSet have the same periodicity, bandwidth, and subcarrier location. When the TRS is aperiodic, periodic CSI-RS resources are in one NZP-CSI-RS-ResourceSet, and aperiodic CSI-RS resources are in another NZP-CSI-RS-ResourceSet, the periodic CSI-RS resources and the aperiodic CSI-RS resources have the same bandwidth (same resource block location), and the aperiodic CSI-RS resources and the periodic CSI-RS resources are in QCL-type A and QCL-type D.

Figure 2:
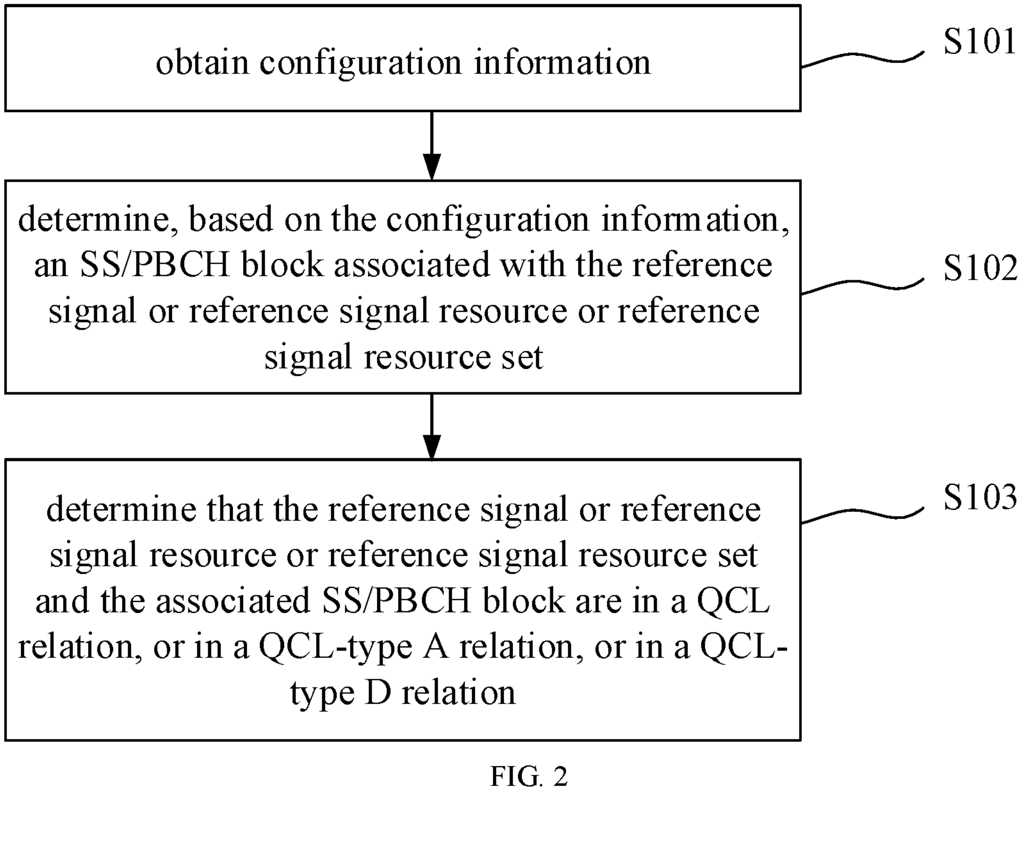
FIG. 2 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 2, the method further includes the following.

S103, determine that the reference signal or reference signal resource or reference signal resource set and the associated SS/PBCH block are in a QCL relation, or in a QCL-type A relation, or in a QCL-type D relation.

The UE determines that the reference signal or reference signal resource or reference signal resource set and the SS/PBCH block have the QCL relation, or the QCL-type A relation, or the QCL-type D relation. Generally, two signals (which can be SS/PBCH block(s) and/or reference signal(s) or reference signal resource(s) or reference signal resource set(s)) being in the QCL relation indicates that these two signals have some same large-scale properties, so that one signal can be used as a reference for channel estimation of the other signal. The QCL-type A and the QCL-type D are two QCL types. In general, two signals being in the QCL-type A relation indicates that these two signals have the same average delay, delay spread, Doppler shift, and Doppler spread; two signals being in the QCL-type D relation indicates that these two signals have the same spatial Rx parameter. In this way, the UE can determine the property of the reference signal by determining the property of the SS/PBCH block, or determine the property of the reference signal by detecting the SS/PBCH block. In the disclosure, signals having the QCL relation also includes signals having the same average gain, having the QCL-type A relation, and having the QCL-type D relation.

Figure 3:
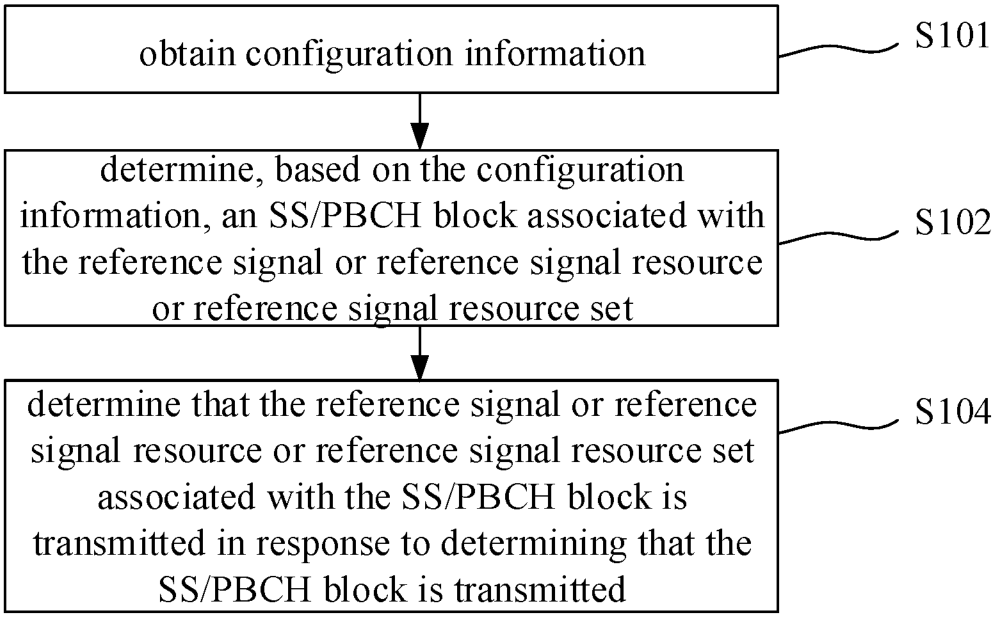
FIG. 3 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 3, the method further includes the following.

S104, determine that the reference signal or reference signal resource or reference signal resource set associated with the SS/PBCH block is transmitted in response to determining that the SS/PBCH block is transmitted.

The UE determines that the reference signal or reference signal resource or reference signal resource set associated with the SS/PBCH block is transmitted if the UE determines that the SS/PBCH block is transmitted. Alternatively, if the UE detects the SS/PBCH block, the UE determines that the reference signal or reference signal resource or reference signal resource set associated with the SS/PBCH block is transmitted. It is noted that, the UE determines whether the SS/PBCH block is transmitted, based on the higher layer parameter ssb-PositionInBurst (one higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the physical downlink share channel (PDSCH) resource mapping, which reduces signaling overhead. In addition, the performance of the UE in detecting the SS/PBCH block is better, which can improve the system performance.

It is noted that, determining that the reference signal or reference signal resource or reference signal resource set associated with the SS/PBCH block is transmitted is equivalent to determining that the reference signal or reference signal resource or reference signal resource set associated with the SS/PBCH block is valid or existing.

Figure 4:
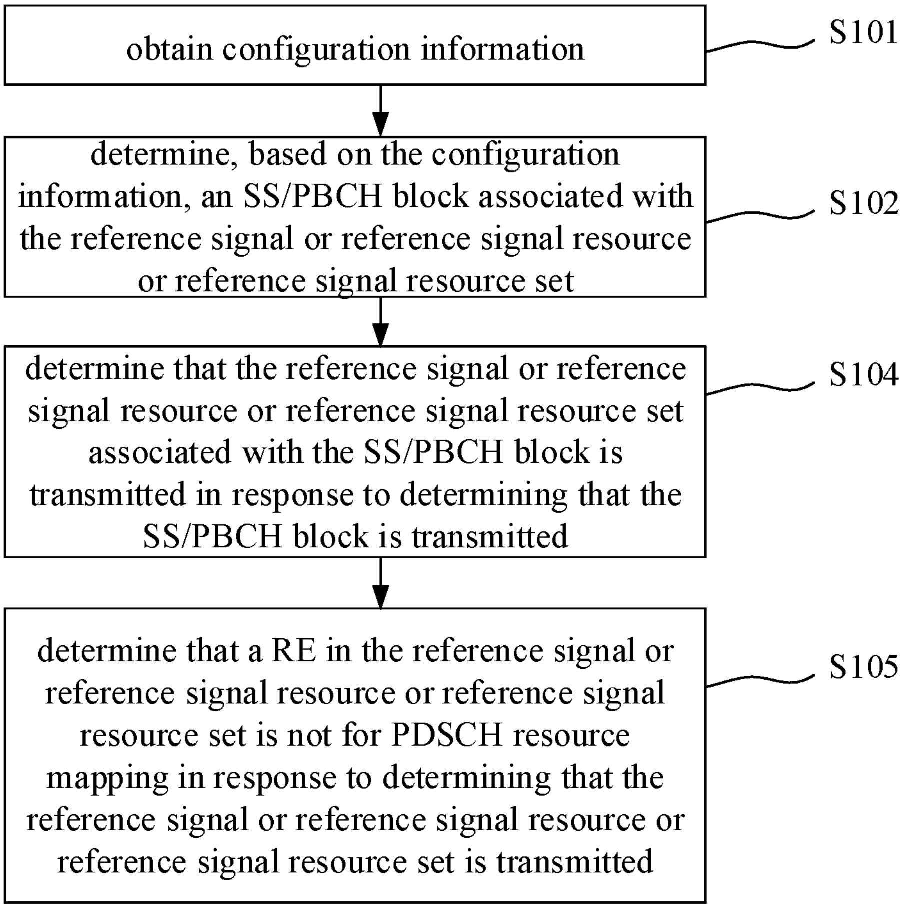
FIG. 4 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 4, the method further includes the following.

S105, determine that a resource element (RE) in the reference signal or reference signal resource or reference signal resource set is not for PDSCH resource mapping in response to determining that the reference signal or reference signal resource or reference signal resource set is transmitted.

If the UE determines that the reference signal or reference signal resource or reference signal resource set is transmitted, the UE determines that the RE in the reference signal or reference signal resource or reference signal resource set is not for PDSCH resource mapping.

Figure 5:
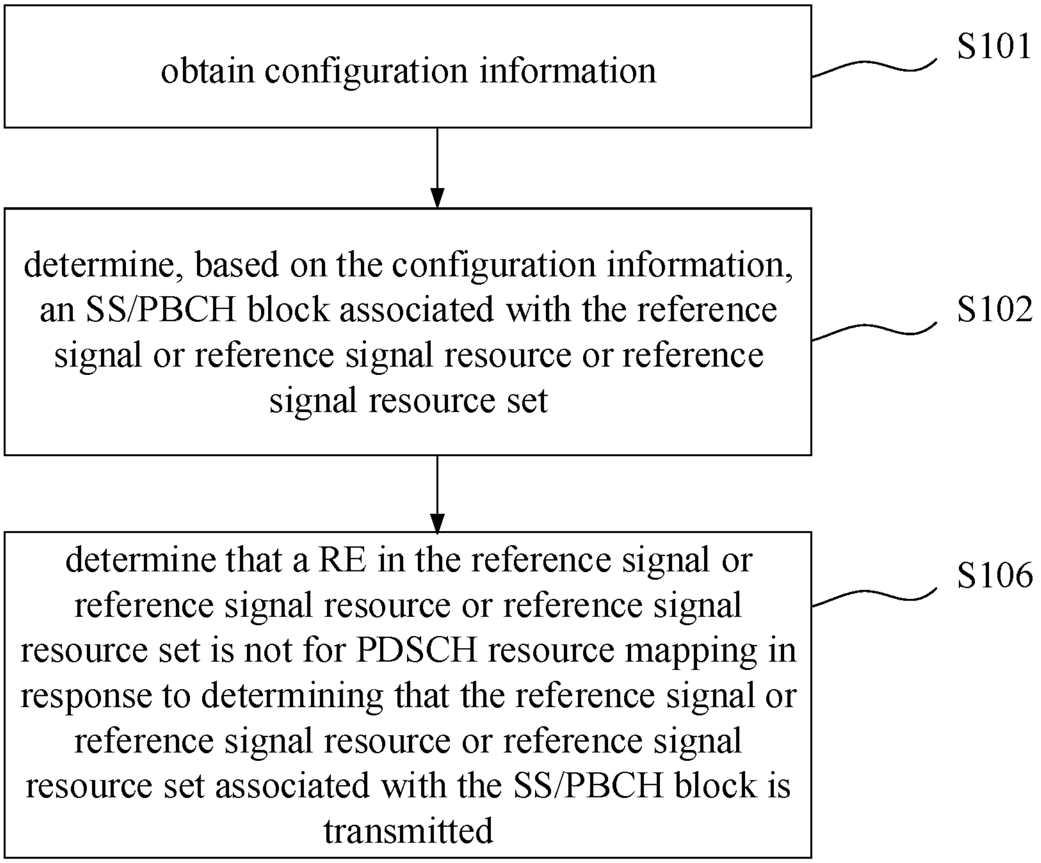
FIG. 5 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 5, the method further includes the following.

S106, determine that a RE in the reference signal or reference signal resource or reference signal resource set is not for PDSCH resource mapping in response to determining that the reference signal or reference signal resource or reference signal resource set associated with the SS/PBCH block is transmitted.

If the UE determines that the reference signal or reference signal resource or reference signal resource set associated with the SS/PBCH block is transmitted, the UE determines that the RE in the reference signal or reference signal resource or reference signal resource set is not for PDSCH resource mapping. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding S S/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

Figure 6:
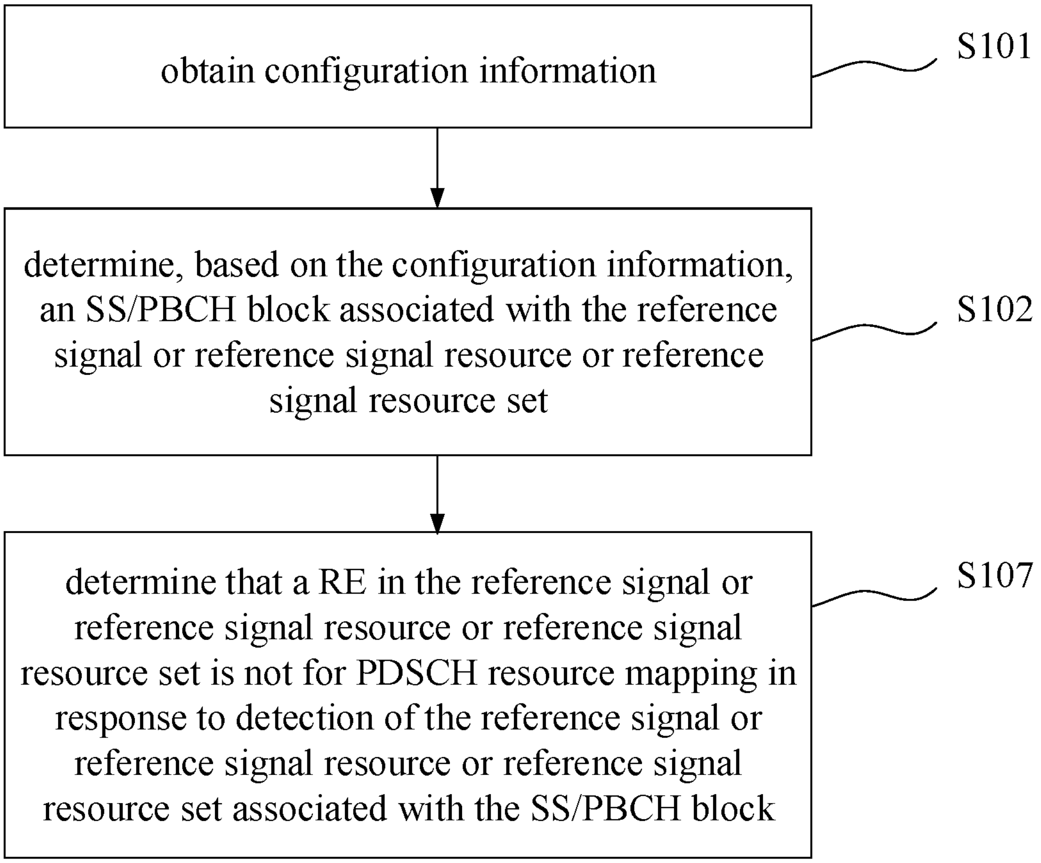
FIG. 6 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 6, the method further includes the following.

S107, determine that a RE in the reference signal or reference signal resource or reference signal resource set is not for PDSCH resource mapping in response to detection of the reference signal or reference signal resource or reference signal resource set associated with the SS/PBCH block.

If the UE determines that the reference signal or reference signal resource or reference signal resource set associated with the SS/PBCH block is detected, the UE determines that the RE in the reference signal or reference signal resource or reference signal resource set is not for PDSCH resource mapping. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

Figure 7:
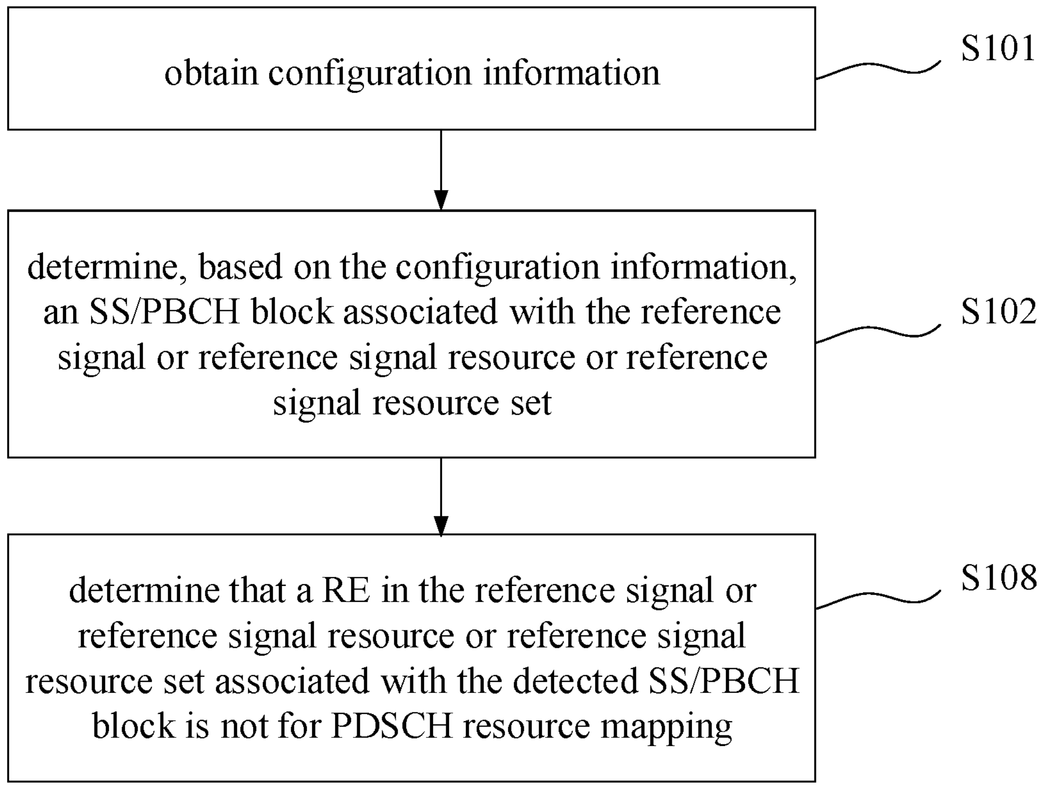
FIG. 7 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 7, the method further includes the following.

S108, determine that a RE in the reference signal or reference signal resource or reference signal resource set associated with the detected SS/PBCH block is not for PDSCH resource mapping.

The UE determines that the RE in the reference signal or reference signal resource or reference signal resource set associated with the detected SS/PBCH block is not for PDSCH resource mapping. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

Figure 8:
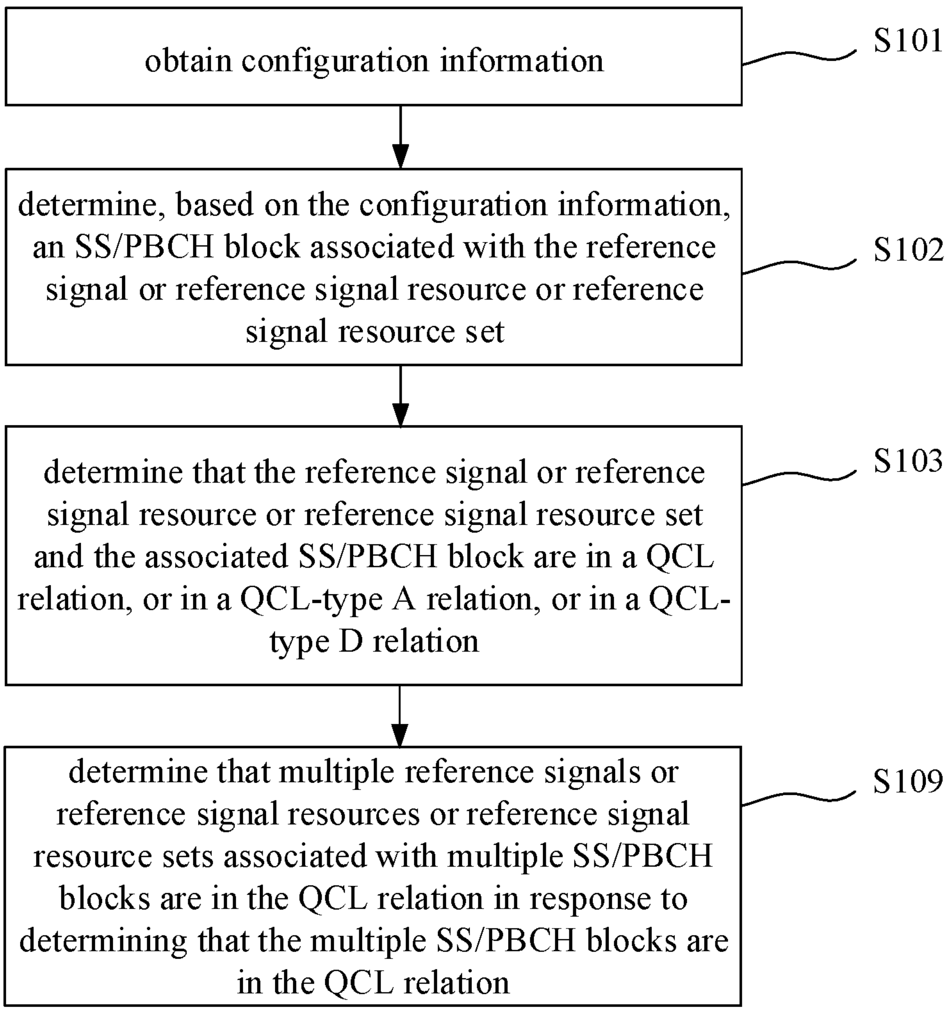
FIG. 8 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 8, the method further includes the following.

S109, determine that multiple reference signals or reference signal resources or reference signal resource sets associated with multiple SS/PBCH blocks are in the QCL relation in response to determining that the multiple SS/PBCH blocks are in the QCL relation.

In the shared spectrum access or unlicensed spectrum access in Release 16, the base station can configure multiple SS/PBCH blocks to have the QCL relation, and inform the UE which SS/PBCH blocks are in the QCL relation through signaling. When the UE knows which SS/PBCH blocks are in the QCL relation, the UE can perform measurement averaging and select to monitor multiple type0-PDCCH monitoring occasions associated with the multiple SS/PBCH blocks having the QCL relation. As such, system performance can be improved.

Figure 9:
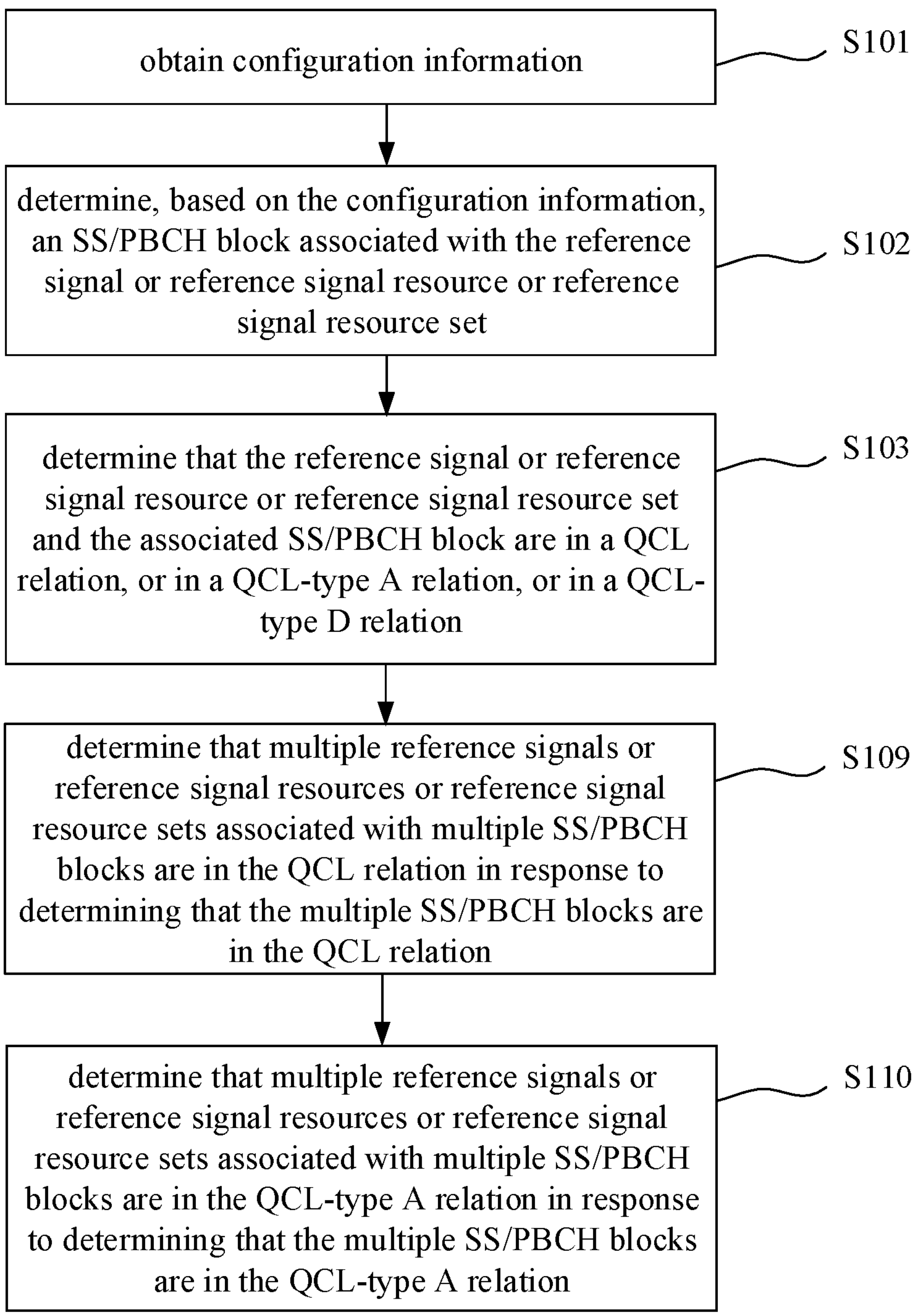
FIG. 9 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 9, the method further includes the following.

S110, determine that multiple reference signals or reference signal resources or reference signal resource sets associated with multiple SS/PBCH blocks are in the QCL-type A relation in response to determining that the multiple SS/PBCH blocks are in the QCL-type A relation. In this way, the QCL is further refined to be the QCL-type A.

Figure 10:
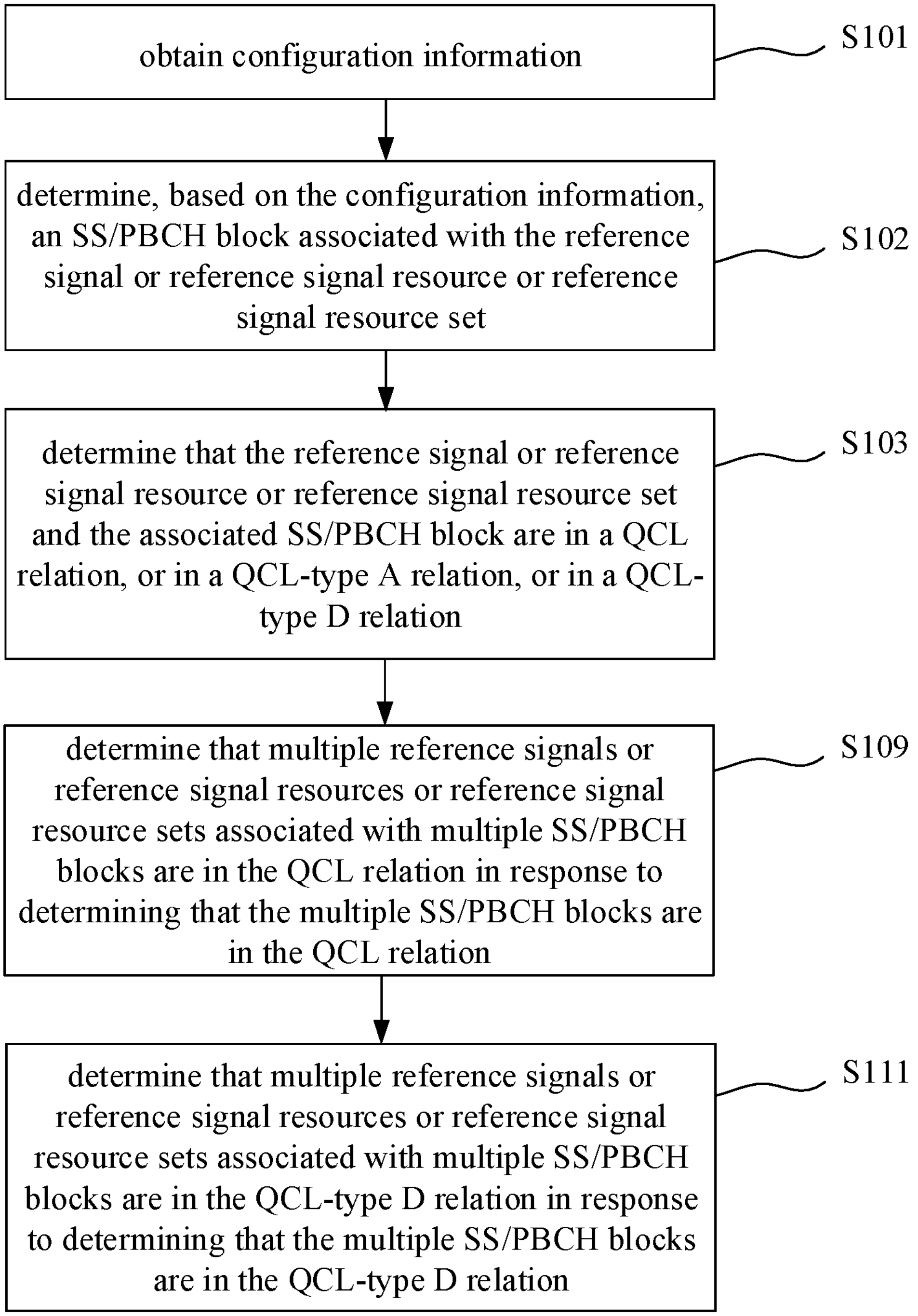
FIG. 10 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 10, the method further includes the following.

S111, determine that multiple reference signals or reference signal resources or reference signal resource sets associated with multiple SS/PBCH blocks are in the QCL-type D relation in response to determining that the multiple SS/PBCH blocks are in the QCL-type D relation. In this way, the QCL is further refined to be the QCL-type D.

Furthermore, if the multiple SS/PBCH blocks have the same average gain, the multiple reference signals or reference signal resources or reference signal resource sets associated with the multiple SS/PBCH blocks are determined to have the same average gain.

Figure 11:
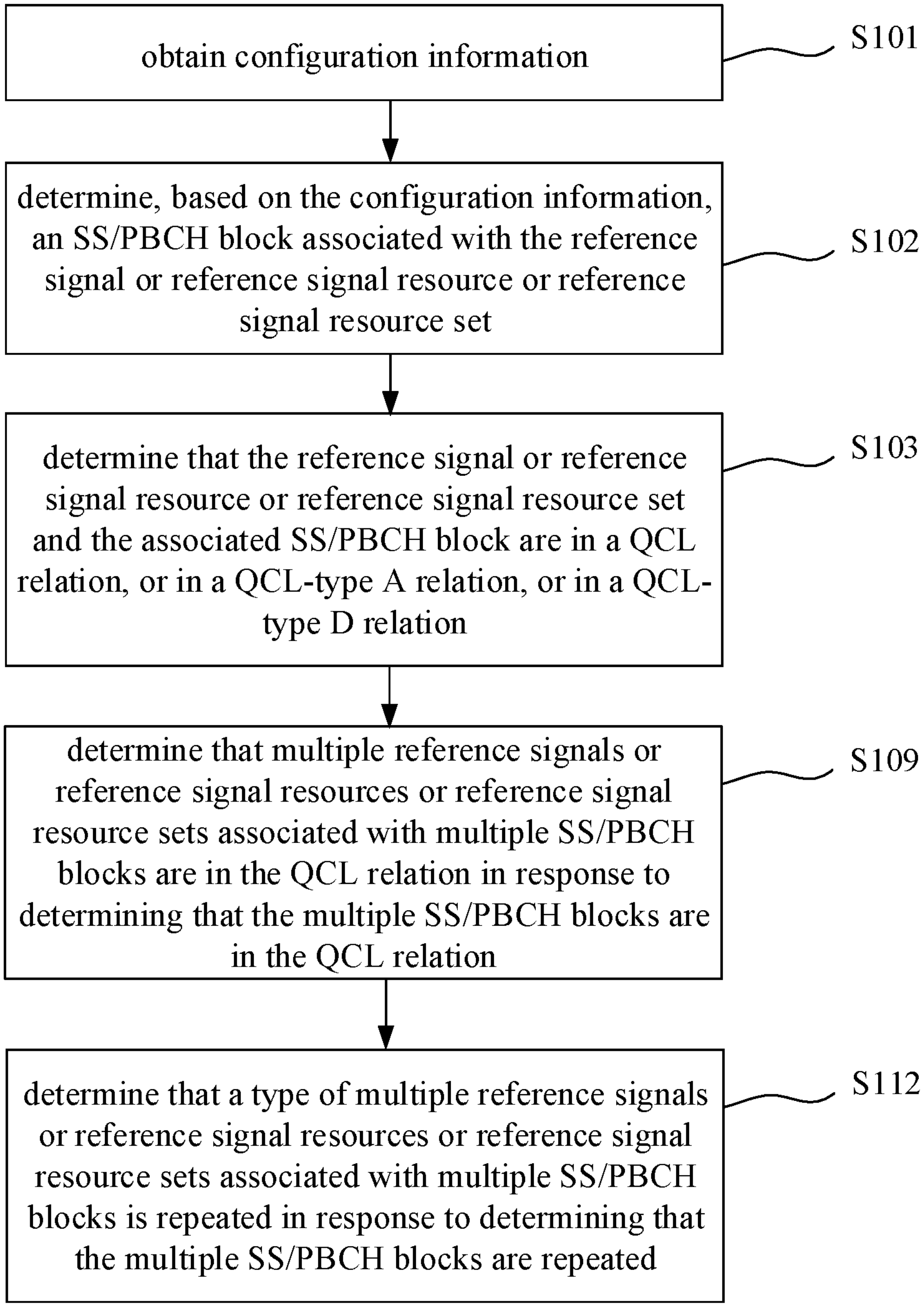
FIG. 11 is a flow chart of a method for determining a reference signal or reference signal resource or reference signal resource set of embodiments of the disclosure.

Embodiments of the disclosure provide a method for determining a reference signal or reference signal resource or reference signal resource set. Referring to FIG. 11, the method further includes the following.

S112, determine that a type of multiple reference signals or reference signal resources or reference signal resource sets associated with multiple SS/PBCH blocks is repeated in response to determining that the multiple SS/PBCH blocks are repeated.

In the shared spectrum access or unlicensed spectrum access in Release 16, the base station can repeatedly transmit the SS/PBCH blocks (using the same beam to transmit different SS/PBCH blocks), and inform the UE which SS/PBCH blocks are repeatedly transmitted through signaling. When the UE knows which SS/PBCH blocks are transmitted repeatedly, the UE can perform measurement averaging and select the type0-PDCCH monitoring occasion. As such, system performance can be improved.

Figure 12:
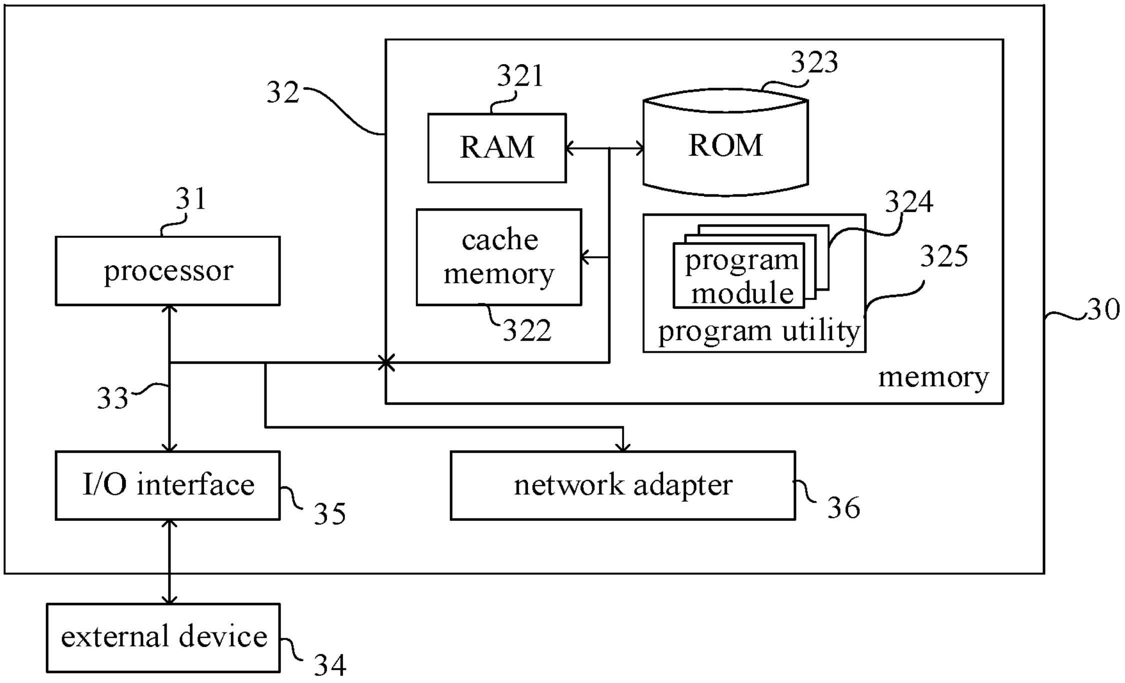
FIG. 12 is a schematic structural diagram of an electronic device of embodiments of the disclosure.

FIG. 12 is a schematic structural diagram of an electronic device of embodiments of the disclosure. The electronic device includes a memory, a processor, and a computer program stored in the memory and executable on the processor. When executing the computer program, the processor implements the method for determining a reference signal or reference signal resource or reference signal resource set of any of embodiment 1 to embodiment 11. The electronic device 30 illustrated in FIG. 12 is merely an example, and should not impose any limitation on the function and use scope of the embodiments of the disclosure.

The electronic device 30 may in the form of a general-purpose computing device, for example, it may be a server device. Components of the electronic device 30 may include, but are not limited to, the above at least one processor 31, the above at least one memory 32, and a bus 33 connecting different system components (including the memory 32 and the processor 31).

The bus 33 includes a data bus, an address bus, and a control bus.

The memory 32 may include volatile memory, such as random access memory (RAM) 321 and/or cache memory 322, and may further include read only memory (ROM) 323.

The memory 32 may also include a program/utility 325 having a set (at least one) of program modules 324. The program modules 324 include, but not limited to, an operating system, one or more application programs, other program modules, and program data. Each or some combination of the examples may include implementation of a network environment.

The processor 31 executes various functional applications and data processing by running the computer program stored in the memory 32, such as the method for determining a reference signal or reference signal resource or reference signal resource set of any of embodiment 1 to embodiment 11 of the disclosure.

The electronic device 30 may also communicate with one or more external devices 34 (e.g., keyboards, pointing devices, etc.). Such communication may be carried out through input/output (I/O) interface 35. Further, the model generating device 30 may also communicate with one or more networks (e.g., a local area network (LAN), a wide area network (WAN), and/or a public network, such as the Internet) through a network adapter 36. As shown in FIG. 12, the network adapter 36 communicates with other modules of the model generating device 30 via the bus 33. It should be understood that, although not shown, in conjunction with the model-generating device 30, other hardware and/or software modules may be used, including but not limited to: microcode, device drivers, redundant processors, external disk drive arrays, redundant array of independent disks (RAID) systems, tape drives, and data backup storage systems.

It should be noted that, although several units/modules or sub-units/modules of the electronic device are mentioned in the above detailed description, this division is merely exemplary and not mandatory. Indeed, the features and functions of two or more units/modules described above may be embodied in one unit/module, based on implementations of the disclosure. Conversely, the features and functions of one unit/module described above may be further divided to be embodied in multiple units/modules.

Embodiments of the disclosure provide a non-transitory computer-readable storage medium. The non-transitory computer-readable storage medium stores a computer program thereon. When executed by a processor, the computer program implements operations of the method for determining a reference signal or reference signal resource or reference signal resource set of any of embodiment 1 to embodiment 11.

More specifically, the readable storage medium may include, but is not limited to, portable disk, hard disk, random access memory, read only memory, erasable programmable read only memory, optical storage device, magnetic storage device, or any suitable combination of the above.

In possible implementations, the disclosure may also be implemented in the form of a program product. The program product includes a program code. When the program product runs on a terminal device, the program code is used to cause the terminal device to execute operations of the method for determining a reference signal or reference signal resource or reference signal resource set of any of embodiment 1 to embodiment 11.

The program code for carrying out the disclosure may be written in any combination of one or more programming languages. The program code may be executed entirely on the user equipment, partly on the user equipment, as a stand-alone software package, partly on the user equipment and partly on a remote device, or entirely on the remote device.

Figure 13:
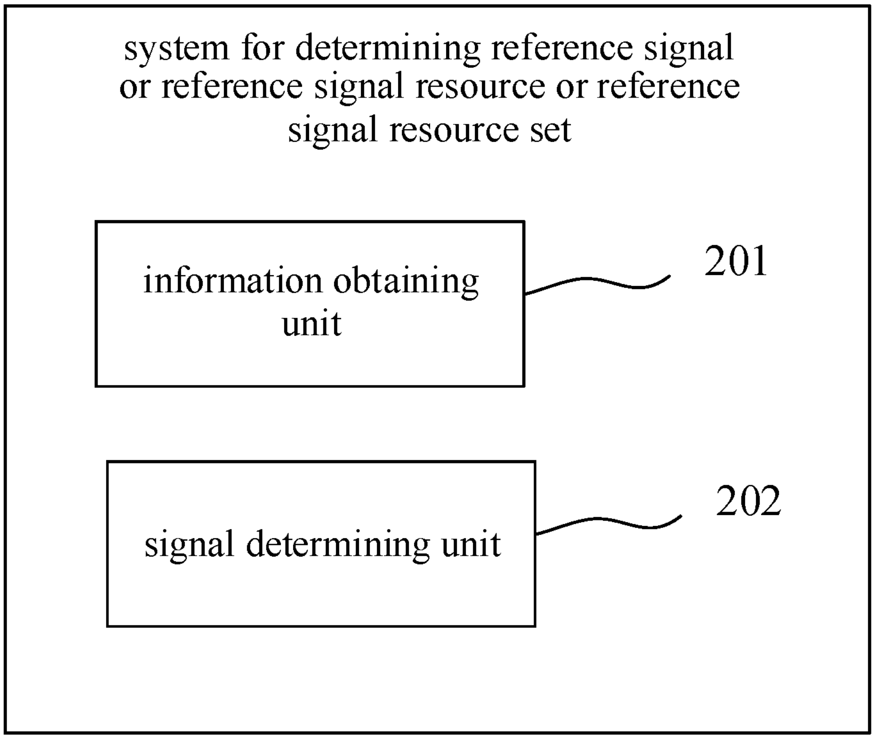
FIG. 13 is a schematic structural diagram of a system for determining a reference signal or reference signal resource or reference signal resource set of embodiments of the disclosure.

Embodiments of the disclosure provide a system for determining a reference signal or reference signal resource or reference signal resource set. Referring to FIG. 13, the system includes an information obtaining unit 201 and a signal determining unit 202. The information obtaining unit 201 is configured to obtain configuration information. The signal determining unit 202 is configured to determine, based on the configuration information, a number or index of an SS/PBCH block associated with the reference signal or reference signal resource or reference signal resource set.

Since the SS/PBCH block burst and the reference signal or reference signal resource or reference signal resource set can be used cooperatively, the SS/PBCH block burst and the reference signal or reference signal resource or reference signal resource set can be associated. The UE obtains the configuration information, and determines the SS/PBCH block associated with the reference signal or reference signal resource or reference signal resource set based on the configuration information, for example, information on the number or index of the SS/PBCH block associated with the reference signal or reference signal resource or reference signal resource set. In other words, the UE obtains the configuration information, and determines the number or index of the SS/PBCH block associated with the reference signal or reference signal resource or reference signal resource set based on the configuration information.

In embodiments of the disclosure, determining the SS/PBCH block associated with the reference signal or reference signal resource or reference signal resource set can be equivalent to the following. Determine that the SS/PBCH block and the reference signal or reference signal resource or reference signal resource set are in a quasi co-location (QCL) relation, or in a quasi co-location type A (QCL-type A) relation, or in a quasi co-location type D (QCL-type D) relation. The determining the SS/PBCH block associated with the reference signal or reference signal resource or reference signal resource set can also be equivalent to the following. Determine an SS/PBCH block having a QCL relation with the reference signal or reference signal resource or reference signal resource set, or an SS/PBCH block having a QCL-type A relation with the reference signal or reference signal resource or reference signal resource set, an SS/PBCH block having a QCL-type D relation with the reference signal or reference signal resource or reference signal resource set. Generally, two signals (which can be SS/PBCH block(s) and/or reference signal(s) or reference signal resource(s) or reference signal resource set(s)) being in the QCL relation indicates that these two signals have some same large-scale properties, so that one signal can be used as a reference for channel estimation of the other signal. The QCL-type A and the QCL-type D are two QCL types. In general, two signals being in the QCL-type A relation indicates that these two signals have the same average delay, delay spread, Doppler shift, and Doppler spread; two signals being in the QCL-type D relation indicates that these two signals have the same spatial Rx parameter. In this way, the UE can determine the property of the reference signal by determining the property of the SS/PBCH block, or determine the property of the reference signal by detecting the SS/PBCH block. In the disclosure, signals having the QCL relation also includes signals having the same average gain, having the QCL-type A relation, and having the QCL-type D relation.

To shorten the time the UE wakes up in advance, a base station may transmit an additional reference signal after the last one SS/PBCH block burst before the PF or PO or the first paging PDCCH monitoring occasion. In this way, the UE can use the SS/PBCH block burst for AGC adjustment and channel tracking and use the additional reference signal for measurement.

The additional reference signal can be used for measurement, so the additional reference signal can be a CSI-RS or an SS. The additional reference signal may be used for mobility or for RRM/RLM measurement, and thus may be CSI-RS for mobility or CSI-RS for RRM/RLM measurement. CSI-RS for mobility or CSI-RS for RRM/RLM measurement may use NZP CSI-RS resource.

To shorten the time the UE wakes up in advance, the base station may transmit two additional reference signals before the PF or PO or the first paging PDCCH monitoring occasion. In this way, the UE can use the first additional reference signal for AGC adjustment and channel tracking and the second additional reference signal for measurement.

The additional reference signal can be used for AGC adjustment and channel tracking, so the additional reference signal may be a TRS or an SS. The TRS may use NZP-CSI-RS-ResourceSet.

Generally, the TRS can include four NZP CSI-RS resources in two consecutive time slots and there are two NZP CSI-RS resources in each time slot; or the TRS can include two NZP CSI-RS resources in one time slot. The TRS can be periodic or aperiodic. When the TRS is periodic, CSI-RS resources in the NZP-CSI-RS-ResourceSet have the same periodicity, bandwidth, and subcarrier location. When the TRS is aperiodic, periodic CSI-RS resources are in one NZP-CSI-RS-ResourceSet, and aperiodic CSI-RS resources are in another NZP-CSI-RS-ResourceSet, the periodic CSI-RS resources and the aperiodic CSI-RS resources have the same bandwidth (same resource block location), and the aperiodic CSI-RS resources and the periodic CSI-RS resources are in QCL-type A and QCL-type D.

Embodiments of the disclosure provide a system for determining a reference signal or reference signal resource or reference signal resource set. As an optional implementation, the signal determining unit 202 is further configured to: determine that the reference signal or reference signal resource or reference signal resource set and the associated SS/PBCH block are in a QCL relation, or in a QCL-type A relation, or in a QCL-type D relation.

The UE determines that the reference signal or reference signal resource or reference signal resource set and the SS/PBCH block have the QCL relation, or the QCL-type A relation, or the QCL-type D relation. Generally, two signals (which can be SS/PBCH block(s) and/or reference signal(s) or reference signal resource(s) or reference signal resource set(s)) being in the QCL relation indicates that these two signals have some same large-scale properties, so that one signal can be used as a reference for channel estimation of the other signal. The QCL-type A and the QCL-type D are two QCL types. In general, two signals being in the QCL-type A relation indicates that these two signals have the same average delay, delay spread, Doppler shift, and Doppler spread; two signals being in the QCL-type D relation indicates that these two signals have the same spatial Rx parameter. In this way, the UE can determine the property of the reference signal by determining the property of the SS/PBCH block, or determine the property of the reference signal by detecting the SS/PBCH block. In the disclosure, signals having the QCL relation also includes signals having the same average gain, having the QCL-type A relation, and having the QCL-type D relation.

Embodiments of the disclosure provide a system for determining a reference signal or reference signal resource or reference signal resource set. As an optional implementation, the signal determining unit 202 is further configured to: determine that the reference signal or reference signal resource or reference signal resource set associated with the SS/PBCH block is transmitted in response to determining that the SS/PBCH block is transmitted.

The UE determines that the reference signal or reference signal resource or reference signal resource set associated with the SS/PBCH block is transmitted if the UE determines that the SS/PBCH block is transmitted. Alternatively, if the UE detects the SS/PBCH block, the UE determines that the reference signal or reference signal resource or reference signal resource set associated with the SS/PBCH block is transmitted. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

It is noted that, determining that the reference signal or reference signal resource or reference signal resource set associated with the SS/PBCH block is transmitted is equivalent to determining that the reference signal or reference signal resource or reference signal resource set associated with the SS/PBCH block is valid or existing.

Embodiments of the disclosure provide a system for determining a reference signal or reference signal resource or reference signal resource set. As an optional implementation, the signal determining unit 202 is further configured to: determine that an RE in the reference signal or reference signal resource or reference signal resource set is not for PDSCH resource mapping in response to determining that the reference signal or reference signal resource or reference signal resource set is transmitted.

If the UE determines that the reference signal or reference signal resource or reference signal resource set is transmitted, the UE determines that the RE in the reference signal or reference signal resource or reference signal resource set is not for PDSCH resource mapping.

Embodiments of the disclosure provide a system for determining a reference signal or reference signal resource or reference signal resource set. As an optional implementation, the signal determining unit 202 is further configured to: determine that a RE in the reference signal or reference signal resource or reference signal resource set is not for PDSCH resource mapping in response to determining that the reference signal or reference signal resource or reference signal resource set associated with the SS/PBCH block is transmitted.

If the UE determines that the reference signal or reference signal resource or reference signal resource set associated with the SS/PBCH block is transmitted, the UE determines that the RE in the reference signal or reference signal resource or reference signal resource set is not for PDSCH resource mapping. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

Embodiments of the disclosure provide a system for determining a reference signal or reference signal resource or reference signal resource set. As an optional implementation, the signal determining unit 202 is further configured to: determine that a RE in the reference signal or reference signal resource or reference signal resource set is not for PDSCH resource mapping in response to detection of the reference signal or reference signal resource or reference signal resource set associated with the SS/PBCH block.

If the UE determines that the reference signal or reference signal resource or reference signal resource set associated with the SS/PBCH block is detected, the UE determines that the RE in the reference signal or reference signal resource or reference signal resource set is not for PDSCH resource mapping. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

Embodiments of the disclosure provide a system for determining a reference signal or reference signal resource or reference signal resource set. As an optional implementation, the signal determining unit 202 is further configured to: determine that a RE in the reference signal or reference signal resource or reference signal resource set associated with the detected SS/PBCH block is not for PDSCH resource mapping.

The UE determines that the RE in the reference signal or reference signal resource or reference signal resource set associated with the detected SS/PBCH block is not for PDSCH resource mapping. It is noted that, the UE determines whether the SS/PBCH block is transmitted, based on the higher layer parameter ssb-PositionInBurst (higher layer parameter). The ssb-PositionInBurst may be a bitmap, where bit "1" indicates that the corresponding SS/PBCH block is transmitted, and bit "0" indicates that the corresponding SS/PBCH block is not transmitted. In this way, through the existing higher layer parameter, the UE can determine whether the reference signal or reference signal resource or reference signal resource set is transmitted and determine the PDSCH resource mapping, which reduces signaling overhead. In addition, the performance of the UE in detecting the SS/PBCH block is better, which can improve the system performance.

Embodiments of the disclosure provide a system for determining a reference signal or reference signal resource or reference signal resource set. As an optional implementation, the signal determining unit 202 is further configured to: determine that multiple reference signals or reference signal resources or reference signal resource sets associated with multiple SS/PBCH blocks are in the QCL relation in response to determining that the multiple SS/PBCH blocks are in the QCL relation.

In the shared spectrum access or unlicensed spectrum access in Release 16, the base station can configure multiple SS/PBCH blocks to have the QCL relation, and inform the UE which SS/PBCH blocks have the QCL relation through signaling. When the UE knows which SS/PBCH blocks have the QCL relation, the UE can perform measurement averaging and select to monitor multiple type0-PDCCH monitoring occasions associated with the multiple SS/PBCH blocks having the QCL relation. As such, system performance can be improved.

Embodiments of the disclosure provide a system for determining a reference signal or reference signal resource or reference signal resource set. As an optional implementation, the signal determining unit 202 is further configured to: determine that multiple reference signals or reference signal resources or reference signal resource sets associated with multiple SS/PBCH blocks are in the QCL-type A relation in response to determining that the multiple SS/PBCH blocks are in the QCL-type A relation. In this way, the QCL is further refined to be the QCL-type A.

Embodiments of the disclosure provide a system for determining a reference signal or reference signal resource or reference signal resource set. As an optional implementation, the signal determining unit 202 is further configured to: determine that multiple reference signals or reference signal resources or reference signal resource sets associated with multiple SS/PBCH blocks are in the QCL-type D relation in response to determining that the multiple SS/PBCH blocks are in the QCL-type D relation. In this way, the QCL is further refined to be the QCL-type D.

Furthermore, if the multiple SS/PBCH blocks have the same average gain, the multiple reference signals or reference signal resources or reference signal resource sets associated with the multiple SS/PBCH blocks are determined to have the same average gain.

Embodiments of the disclosure provide a system for determining a reference signal or reference signal resource or reference signal resource set. As an optional implementation, the signal determining unit 202 is further configured to: determine that a type of multiple reference signals or reference signal resources or reference signal resource sets associated with multiple SS/PBCH blocks is repeated in response to determining that the multiple SS/PBCH blocks are repeated.

In the shared spectrum access or unlicensed spectrum access in Release 16, the base station can repeatedly transmit the SS/PBCH blocks (using the same beam to transmit different SS/PBCH blocks), and inform the UE which SS/PBCH blocks are repeatedly transmitted through signaling. When the UE knows which SS/PBCH blocks are transmitted repeatedly, the UE can perform measurement averaging and select the type0-PDCCH monitoring occasion. As such, system performance can be improved.

The disclosure provides a method for determining a reference signal or reference signal resource or reference signal resource set, an electronic device, and a medium, to overcome the technical problems in the related art that a user equipment (UE) wakes up in advance for a long time in response to a synchronization signal/physical broadcast channel block burst (SS/PBCH block burst) and consumes more power.

The disclosure overcomes the above technical problems through the following technical solutions.

The disclosure provides a method for determining a reference signal or reference signal resource or reference signal resource set. The method includes: obtaining configuration information; and determining, based on the configuration information, a synchronization signal/physical broadcast channel block (SS/PBCH block) associated with the reference signal or reference signal resource or reference signal resource set.

Optionally, the method further includes: determining that the reference signal or reference signal resource or reference signal resource set and the associated SS/PBCH block are in a quasi co-location (QCL) relation, or in a quasi co-location type A (QCL-type A) relation, or in a quasi co-location type D (QCL-type D) relation.

Optionally, the method further includes: determining that the reference signal or reference signal resource or reference signal resource set is transmitted in response to determining that the SS/PBCH block associated with the reference signal or reference signal resource or reference signal resource set is transmitted.

Optionally, the method further includes: determining that a resource element (RE) in the reference signal or reference signal resource or reference signal resource set is not for physical downlink share channel (PDSCH) resource mapping in response to determining that the reference signal or reference signal resource or reference signal resource set is transmitted.

Optionally, the method further includes: determining that a RE in the reference signal or reference signal resource or reference signal resource set is not for PDSCH resource mapping in response to determining that the SS/PBCH block associated with the reference signal or reference signal resource or reference signal resource set is transmitted.

Optionally, the method further includes: determining that a RE in the reference signal or reference signal resource or reference signal resource set is not for PDSCH resource mapping in response to detection of the SS/PBCH block associated with the reference signal or reference signal resource or reference signal resource set.

Optionally, the method further includes: determining that a RE in the reference signal or reference signal resource or reference signal resource set associated with the detected SS/PBCH block is not for PDSCH resource mapping.

Optionally, the method further includes: determining that multiple reference signals or reference signal resources or reference signal resource sets associated with multiple SS/PBCH blocks are in the QCL relation in response to determining that the multiple SS/PBCH blocks are in the QCL relation.

Optionally, the method further includes: determining that multiple reference signals or reference signal resources or reference signal resource sets associated with multiple SS/PBCH blocks are in the QCL-type A relation in response to determining that the multiple SS/PBCH blocks are in the QCL-type A relation.

Optionally, the method further includes: determining that multiple reference signals or reference signal resources or reference signal resource sets associated with multiple SS/PBCH blocks are in the QCL-type D relation in response to determining that the multiple SS/PBCH blocks are in the QCL-type D relation.

Optionally, the method further includes: determining that a type of multiple reference signals or reference signal resources or reference signal resource sets associated with multiple SS/PBCH blocks is repeated in response to determining that the multiple SS/PBCH blocks are repeated.

The disclosure provides a system for determining a reference signal or reference signal resource or reference signal resource set. The system includes an information obtaining unit and a signal determining unit.

The information obtaining unit is configured to obtain configuration information. The signal determining unit is configured to determine, based on the configuration information, a number or index of an SS/PBCH block associated with the reference signal or reference signal resource or reference signal resource set.

Optionally, the signal determining unit is further configured to: determine that the reference signal or reference signal resource or reference signal resource set and the associated SS/PBCH block are in a QCL relation, or in a QCL-type A relation, or in a QCL-type D relation.

Optionally, the signal determining unit is further configured to: determine that the reference signal or reference signal resource or reference signal resource set is transmitted in response to determining that the SS/PBCH block associated with the reference signal or reference signal resource or reference signal resource set is transmitted.

Optionally, the signal determining unit is further configured to: determine that a RE in the reference signal or reference signal resource or reference signal resource set is not for PDSCH resource mapping in response to determining that the reference signal or reference signal resource or reference signal resource set is transmitted.

Optionally, the signal determining unit is further configured to: determine that a RE in the reference signal or reference signal resource or reference signal resource set is not for PDSCH resource mapping in response to determining that the SS/PBCH block associated with the reference signal or reference signal resource or reference signal resource set is transmitted.

Optionally, the signal determining unit is further configured to: determine that a RE in the reference signal or reference signal resource or reference signal resource set is not for PDSCH resource mapping in response to detection of the SS/PBCH block associated with the reference signal or reference signal resource or reference signal resource set.

Optionally, the signal determining unit is further configured to: determine that a RE in the reference signal or reference signal resource or reference signal resource set associated with the detected SS/PBCH block is not for PDSCH resource mapping.

Optionally, the signal determining unit is further configured to: determine that multiple reference signals or reference signal resources or reference signal resource sets associated with multiple SS/PBCH blocks are in the QCL relation in response to determining that the multiple SS/PBCH blocks are in the QCL relation.

Optionally, the signal determining unit is further configured to: determine that multiple reference signals or reference signal resources or reference signal resource sets associated with multiple SS/PBCH blocks are in the QCL-type A relation in response to determining that the multiple SS/PBCH blocks are in the QCL-type A relation.

Optionally, the signal determining unit is further configured to: determine that multiple reference signals or reference signal resources or reference signal resource sets associated with multiple SS/PBCH blocks are in the QCL-type D relation in response to determining that the multiple SS/PBCH blocks are in the QCL-type D relation.

Optionally, the signal determining unit is further configured to: determine that a type of multiple reference signals or reference signal resources or reference signal resource sets associated with multiple SS/PBCH blocks is repeated in response to determining that the multiple SS/PBCH blocks are repeated.

The disclosure further provides an electronic device. The electronic device includes a memory, a processor, and a computer program stored in the memory and executable on the processor. When executing the computer program, the processor implements the method for determining a reference signal or reference signal resource or reference signal resource set of the disclosure.

The disclosure further provides a non-transitory computer-readable storage medium. The non-transitory computer-readable storage medium stores a computer program thereon. When executed by a processor, the computer program implements operations of the method for determining a reference signal or reference signal resource or reference signal resource set of the disclosure.

The progressive advantageous effect of the disclosure is that: energy of the UE can be saved by configuring the reference signal or reference signal resource or reference signal resource set.

Although the specific implementations of the disclosure are described above, those skilled in the art should understand that these are merely for illustration, and the protection scope of the disclosure is defined by the appended claims. Those skilled in the art can make various changes or modifications to these implementations without departing from the principle and essence of the disclosure, but these changes and modifications all fall within the protection scope of the disclosure.

What is claimed is:

1. A method for determining a reference signal, comprising:

obtaining configuration information, wherein the configuration information includes an index of a synchronization signal/physical broadcast channel block (SS/PBCH block) associated with the reference signal, and the reference signal is a tracking reference signal (TRS) used for a user equipment in an idle mode; and determining, based on the configuration information, the SS/PBCH block associated with the reference signal;

the determining the SS/PBCH block associated with the reference signal comprising:

determining that the reference signal and the associated SS/PBCH block are in a quasi co-location type D (QCL-type D) relation; and determining that a plurality of reference signals or reference signal resources or reference signal resource sets associated with a plurality of SS/PBCH blocks are repeated in response to the plurality of SS/PBCH blocks being repeated.

2. The method of claim 1, further comprising: determining that the reference signal is transmitted in response to determining that the SS/PBCH block associated with the reference signal is transmitted.

3. The method of claim 2, further comprising: determining that a resource element (RE) in the reference signal is not for physical downlink share channel (PDSCH) resource mapping in response to determining that the reference signal is transmitted.

4. The method of claim 1, further comprising: determining that a RE in the reference signal is not for PDSCH resource mapping in response to determining that the SS/PBCH block associated with the reference signal is transmitted.

5. The method of claim 1, further comprising: determining that a RE in the reference signal is not for PDSCH resource mapping in response to detection of the SS/PBCH block associated with the reference signal.

6. The method of claim 1, further comprising: determining that a RE in the reference signal associated with the detected SS/PBCH block is not for PDSCH resource mapping.

7. The method of claim 1, further comprising: determining that a plurality of reference signals or reference signal resources or reference signal resource sets associated with a plurality of SS/PBCH blocks are in a quasi co-location (QCL) relation in response to determining that the plurality of SS/PBCH blocks are in the QCL relation.

8. The method of claim 1, further comprising: determining that a plurality of reference signals or reference signal resources or reference signal resource sets associated with a plurality of SS/PBCH blocks are in a quasi co-location type A (QCL-type A) relation in response to determining that the plurality of SS/PBCH blocks are in the QCL-type A relation.

9. The method of claim 1, further comprising: determining that a plurality of reference signals or reference signal resources or reference signal resource sets associated with a plurality of SS/PBCH blocks are in the QCL-type D relation in response to determining that the plurality of SS/PBCH blocks are in the QCL-type D relation.

10. An electronic device, comprising:
a memory configured to store a computer program; and
a processor coupled with the memory and configured to execute the computer program to:
obtain configuration information, wherein the configuration information includes an index of a synchronization signal/physical broadcast channel block (SS/PBCH block) associated with the reference signal, and the reference signal is a tracking reference signal (TRS) used for a user equipment in an idle mode; and
determine, based on the configuration information, the SS/PBCH block associated with the reference signal;
the processor configured to execute the computer program to determine the SS/PBCH block associated with the reference signal being configured to:
determine that the reference signal and the associated SS/PBCH block are in a quasi co-location type D (QCL-type D) relation;
wherein the processor is further configured to determine that a plurality of reference signals or reference signal resources or reference signal resource sets associated with a plurality of SS/PBCH blocks are repeated in response to the plurality of SS/PBCH blocks being repeated.

11. The electronic device of claim 10, wherein the processor is further configured to execute the computer program to: determine that the reference signal is transmitted in response to determining that the SS/PBCH block associated with the reference signal is transmitted.

12. The electronic device of claim 11, wherein the processor is further configured to execute the computer program to: determine that a resource element (RE) in the reference signal is not for physical downlink share channel (PDSCH) resource mapping in response to determining that the reference signal is transmitted.

13. The electronic device of claim 10, wherein the processor is further configured to execute the computer program to: determine that a RE in the reference signal is not for PDSCH resource mapping in response to determining that the SS/PBCH block associated with the reference signal is transmitted.

14. The electronic device of claim 10, wherein the processor is further configured to execute the computer program to: determine that a RE in the reference signal is not for PDSCH resource mapping in response to detection of the SS/PBCH block associated with the reference signal.

15. The electronic device of claim 10, wherein the processor is further configured to execute the computer program to: determine that a RE in the reference signal associated with the detected SS/PBCH block is not for PDSCH resource mapping.

16. The electronic device of claim 10, wherein the processor is further configured to execute the computer program to: determine that a plurality of reference signals or reference signal resources or reference signal resource sets associated with a plurality of SS/PBCH blocks are in a quasi co-location (QCL) relation in response to determining that the plurality of SS/PBCH blocks are in the QCL relation.

17. A non-transitory computer-readable storage medium storing a computer program thereon, wherein when executed by a processor, the computer program implements:
obtaining configuration information, wherein the configuration information includes an index of a synchronization signal/physical broadcast channel block (SS/PBCH block) associated with the reference signal, and the reference signal is a tracking reference signal (TRS) used for a user equipment in an idle mode; and
determining, based on the configuration information, the SS/PBCH block associated with the reference signal;
the determining the SS/PBCH block associated with the reference signal comprising:
determining that the reference signal and the associated SS/PBCH block are in a quasi co-location type D (QCL-type D) relation; and
determining that a plurality of reference signals or reference signal resources or reference signal resource sets associated with a plurality of SS/PBCH blocks are repeated in response to the plurality of SS/PBCH blocks being repeated.

* * * * *